(12) United States Patent
Ewing et al.

(10) Patent No.: US 10,696,391 B2
(45) Date of Patent: Jun. 30, 2020

(54) EXTENDED RANGE QUAD TILTROTOR AIRCRAFT

(71) Applicant: Textron Innovations Inc., Providence, RI (US)

(72) Inventors: Alan Carl Ewing, Keller, TX (US); Eric Ricardo Gonzalez, Fort Worth, TX (US); Mark Loring Isaac, Fort Worth, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 245 days.

(21) Appl. No.: 15/815,411

(22) Filed: Nov. 16, 2017

(65) Prior Publication Data

US 2019/0144109 A1     May 16, 2019

(51) Int. Cl.
*B64C 29/00* (2006.01)
*G05D 1/08* (2006.01)
(Continued)

(52) U.S. Cl.
CPC .......... *B64C 29/0033* (2013.01); *B64C 11/28* (2013.01); *B64C 27/08* (2013.01);
(Continued)

(58) Field of Classification Search
CPC . B64C 29/00; B64C 29/0008; B64C 29/0016; B64C 29/0033
See application file for complete search history.

(56) References Cited

U.S. PATENT DOCUMENTS

| 2,437,700 A | 3/1948 | MacFarland, Jr. |
| 3,254,725 A * | 6/1966 | Higgins .............. B64C 29/0033 416/149 |

(Continued)

FOREIGN PATENT DOCUMENTS

| CA | 2368595 A1 | 7/2002 |
| CN | 103693194 A | 4/2014 |

(Continued)

OTHER PUBLICATIONS

European Search Report; Application No. EP 18195578.2; European Patent Office; dated Mar. 3, 2019.
(Continued)

*Primary Examiner* — Michael H Wang
(74) *Attorney, Agent, or Firm* — Lawrence Youst PLLC

(57) ABSTRACT

A quad tiltrotor aircraft has a longitudinally extending fuselage with forward and aft stations. A forward wing having first and second outboard ends extends laterally from the forward station. An aft wing having first and second outboard ends extends laterally from the aft station. First and second forward rotors are respectively coupled proximate the first and second outboard ends of the forward wing and are tiltable relative to the forward wing between vertical lift and forward thrust orientations. First and second aft rotors are respectively coupled proximate the first and second outboard ends of the aft wing and are tiltable relative to the aft wing between vertical lift and forward thrust orientations. The forward rotors are higher disk-loading rotors than the aft rotors. The aft rotors are foldable in the forward flight mode to provide extended range for the quad tiltrotor aircraft.

20 Claims, 10 Drawing Sheets

(51) Int. Cl.
  *B64C 27/28* (2006.01)
  *B64C 27/26* (2006.01)
  *B64C 27/08* (2006.01)
  *B64C 27/30* (2006.01)
  *B64C 39/08* (2006.01)
  *G05D 1/00* (2006.01)
  *B64C 11/28* (2006.01)

(52) U.S. Cl.
  CPC .............. *B64C 27/26* (2013.01); *B64C 27/28* (2013.01); *B64C 27/30* (2013.01); *B64C 29/0075* (2013.01); *B64C 39/08* (2013.01); *G05D 1/0077* (2013.01); *G05D 1/0858* (2013.01)

(56) References Cited

U.S. PATENT DOCUMENTS

| | | | | |
|---|---|---|---|---|
| 5,352,090 | A * | 10/1994 | Churchill | B64C 27/008 416/34 |
| 5,823,468 | A | 10/1998 | Bothe | |
| D453,317 | S | 2/2002 | DeTore et al. | |
| D458,892 | S * | 6/2002 | DeTore | B64C 29/0033 D12/319 |
| D498,201 | S * | 11/2004 | Moller | B64C 29/0033 D12/319 |
| 7,004,426 | B2 * | 2/2006 | Kisor | B64C 27/28 244/17.13 |
| 8,800,912 | B2 | 8/2014 | Oliver | |
| 9,835,093 | B2 | 12/2017 | Golshany et al. | |
| 10,179,647 | B1 * | 1/2019 | Meugnier | B64C 39/024 |
| 2007/0158494 | A1 | 7/2007 | Burrage | |
| 2009/0256026 | A1 * | 10/2009 | Karem | B64C 27/08 244/99.2 |
| 2011/0001020 | A1 * | 1/2011 | Forgac | B64C 29/0033 244/7 A |
| 2011/0180656 | A1 | 7/2011 | Shue et al. | |
| 2011/0315809 | A1 * | 12/2011 | Oliver | B64C 29/0033 244/12.4 |
| 2013/0039764 | A1 | 2/2013 | Perkinson | |
| 2015/0360775 | A1 * | 12/2015 | Arai | B64D 27/24 244/12.1 |
| 2016/0031555 | A1 | 2/2016 | Bevirt et al. | |
| 2016/0046382 | A1 | 2/2016 | Alber | |
| 2016/0076629 | A1 * | 3/2016 | Modrzejewski | F16H 3/58 244/17.11 |
| 2016/0244158 | A1 * | 8/2016 | Fredericks | B64C 25/52 |
| 2017/0144746 | A1 | 5/2017 | Schank et al. | |
| 2018/0281942 | A1 | 10/2018 | Scott et al. | |
| 2018/0370625 | A1 | 12/2018 | Netzer | |

FOREIGN PATENT DOCUMENTS

| | | |
|---|---|---|
| CN | 104229129 A | 12/2014 |
| DE | 102006028226 A1 | 12/2007 |
| WO | 2015073084 A1 | 5/2015 |
| WO | 2016062223 A1 | 4/2016 |

OTHER PUBLICATIONS

European Exam Report; Application No. EP 18195578.2; European Patent Office; dated Mar. 18, 2019.

* cited by examiner

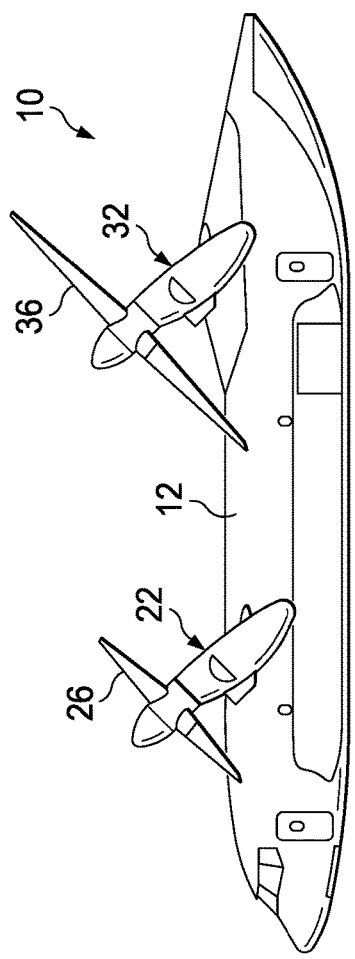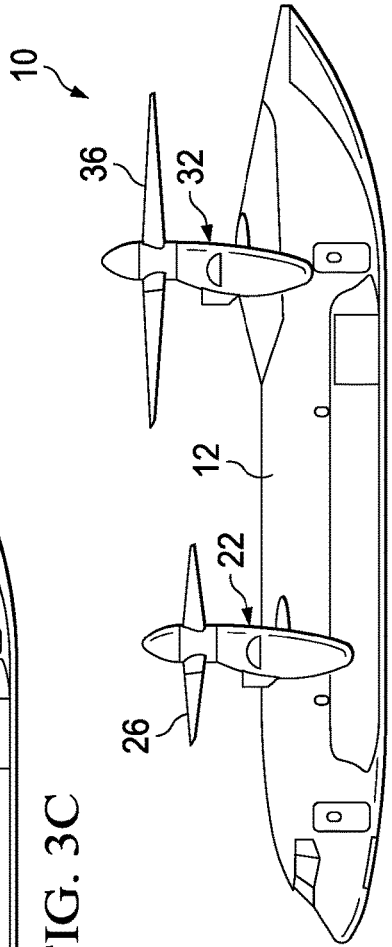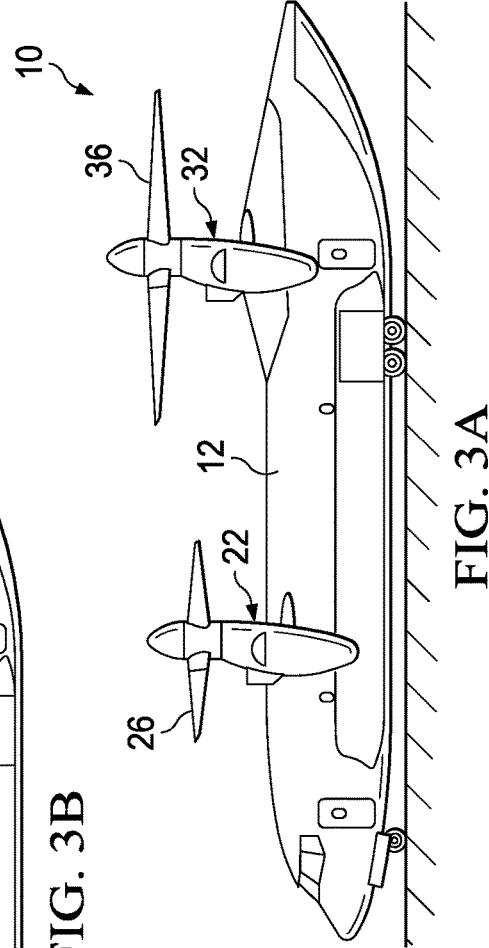

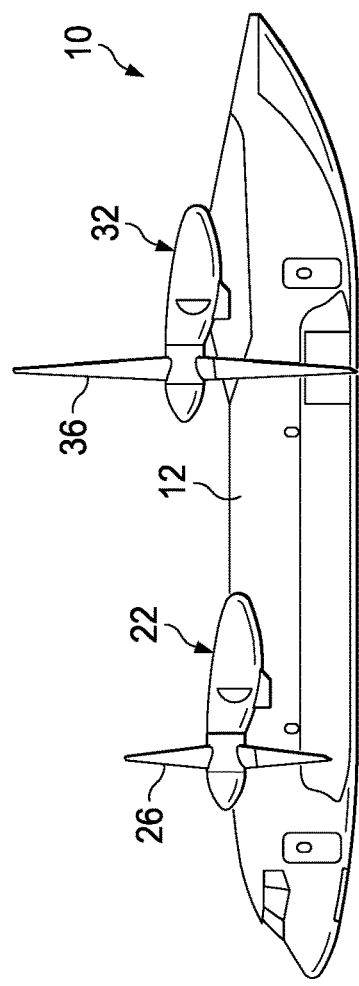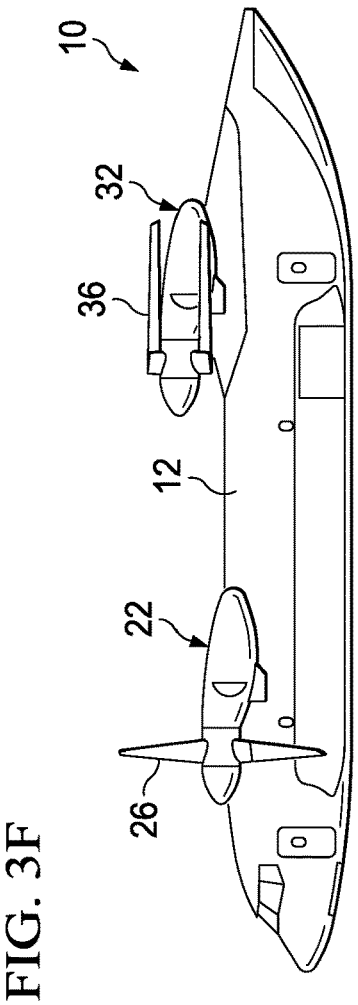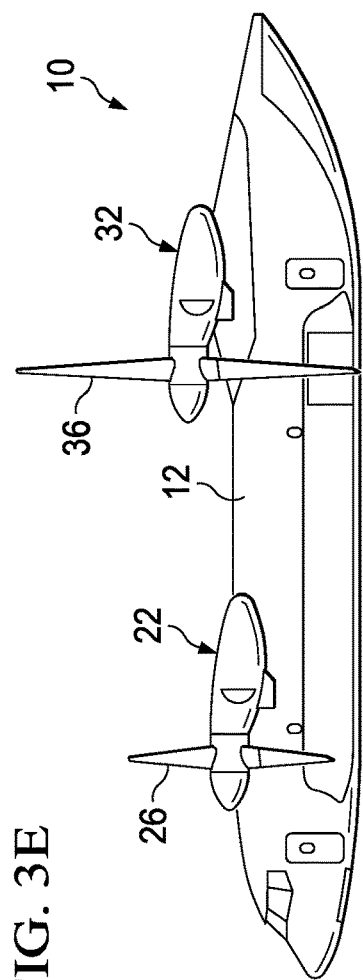

EXTENDED RANGE QUAD TILTROTOR AIRCRAFT

TECHNICAL FIELD OF THE DISCLOSURE

The present disclosure relates, in general, to aircraft having a forward flight mode and a vertical takeoff and landing flight mode and, in particular, to quad tiltrotor aircraft having higher disk-loading forward rotors and lower disk-loading aft rotors that are foldable in the forward flight mode to provide extended range.

BACKGROUND

Fixed-wing aircraft, such as airplanes, are capable of flight using wings that generate lift responsive to the forward airspeed of the aircraft, which is generated by forward thrust from one or more jet engines or propellers. The wings have an airfoil cross section that deflects air downwardly as the aircraft moves forward, generating vertical lift to support the airplane in flight. Fixed-wing aircraft, however, require a runway for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter, which is a rotorcraft having one or more rotors that provide vertical lift and forward thrust to the aircraft. Helicopter rotors not only enable hovering, vertical takeoff and vertical landing, but also enable, forward, aftward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft utilize tiltable rotor systems that are operable to transition between a vertical lift orientation and a forward thrust orientation. The rotor systems are tiltable relative to a fixed wing such that the associated proprotors have a generally horizontal plane of rotation for vertical takeoff, hovering and vertical landing and a generally vertical plane of rotation for forward flight, wherein the fixed wing provides lift. In this manner, tiltrotor aircraft combine the vertical lift capability of a helicopter with the speed and range of fixed-wing aircraft.

SUMMARY

In a first aspect, the present disclosure is directed to a quad tiltrotor aircraft having a vertical takeoff and landing flight mode and a forward flight mode. The aircraft includes a longitudinally extending fuselage having forward and aft stations. A forward wing extends laterally from the forward station and has first and second outboard ends. An aft wing extends laterally from the aft station and has first and second outboard ends. First and second forward rotors are respectively coupled proximate the first and second outboard ends of the forward wing. The first and second forward rotors are reversibly tiltable relative to the forward wing between a vertical lift orientation and a forward thrust orientation. First and second aft rotors are respectively coupled proximate the first and second outboard ends of the aft wing. The first and second aft rotors are reversibly tiltable relative to the aft wing between a vertical lift orientation and a forward thrust orientation. The forward rotors are higher disk-loading rotors than the aft rotors. The aft rotors are foldable in the forward flight mode to provide extended range for the quad tiltrotor aircraft.

In some embodiments, the aft wing may have a greater span than the forward wing. In certain embodiments, the aft wing may have a higher elevation than the forward wing in level flight. In some embodiments, the aft rotors may have a larger diameter than the forward rotors. In certain embodiments, the forward rotors may co-rotate. In other embodiments, the forward rotors may counter-rotate. In some embodiments, the aft rotors may counter-rotate. In certain embodiments, the forward rotors may be rigid rotors. In some embodiments, the forward rotors may have collective pitch control. In certain embodiments, the aft rotors may be gimbaled rotors. In some embodiments, the aft rotors may have collective pitch control. In certain embodiments, the aft rotors may have cyclic pitch control.

In some embodiments, at least one engine may be operable to drive the forward and aft rotors. For example, first and second forward engines may be operable to respectively drive the first and second forward rotors and first and second aft engines may be operable to respectively drive the first and second aft rotors. In such embodiments, the aft rotors may be coupled together with a cross shaft such that either of the aft engines may be operable to drive either or both of the first and second aft rotors. Also, in such embodiments, the forward rotors may not be coupled together with a cross shaft. In certain embodiments, the aft rotors may be operable to disengage from the engine during forward flight mode. In such embodiments, the aft rotors may be operable to autorotate. In some embodiments, the forward and aft rotors may have differential collective control. In certain embodiments, the quad tiltrotor aircraft may have a short takeoff and landing mode wherein the forward rotors are in the forward thrust orientation and the aft rotors are in the vertical lift orientation. In some embodiments, the quad tiltrotor aircraft may have short takeoff and landing mode wherein the forward rotors are between the vertical lift and forward thrust orientations and the aft rotors are between the vertical lift and forward thrust orientations In a second aspect, the present disclosure is directed to a tiltrotor aircraft having a vertical takeoff and landing flight mode and a forward flight mode. The aircraft includes a longitudinally extending fuselage having forward, mid and aft stations. A forward wing extends laterally from the forward station and has first and second outboard ends. A mid wing extends laterally from the mid station and has first and second outboard ends. An aft wing extends laterally from the aft station and has first and second outboard ends. First and second forward rotors are respectively coupled proximate the first and second outboard ends of the forward wing. The first and second forward rotors are reversibly tiltable relative to the forward wing between a vertical lift orientation and a forward thrust orientation. First and second mid rotors are respectively coupled proximate the first and second outboard ends of the mid wing. The first and second mid rotors are reversibly tiltable relative to the mid wing between a vertical lift orientation and a forward thrust orientation. First and second aft rotors are respectively coupled proximate the first and second outboard ends of the aft wing. The first and second aft rotors are reversibly tiltable relative to the aft wing between a vertical lift orientation and a forward thrust orientation. The forward rotors are higher disk-loading rotors than the mid and aft rotors. The mid and aft rotors are foldable in the forward flight mode to provide extended range for the tiltrotor aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3I are schematic illustrations of a quad tiltrotor aircraft having higher disk-loading forward rotors and lower disk-loading aft rotors in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the term "coupled" may include direct or indirect coupling by any means, including moving and/or non-moving mechanical connections.

Figure 1B:
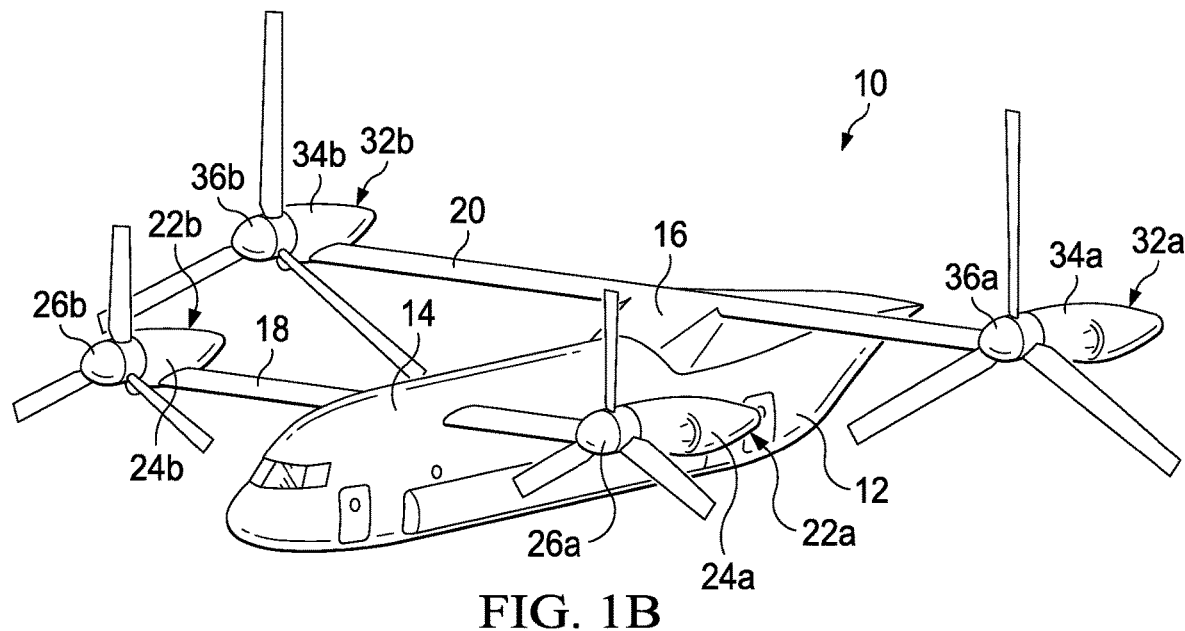
FIGS. 1A-1H are schematic illustrations of a quad tiltrotor aircraft having higher disk-loading forward rotors and lower disk-loading aft rotors in accordance with embodiments of the present disclosure.
Figure 1A:
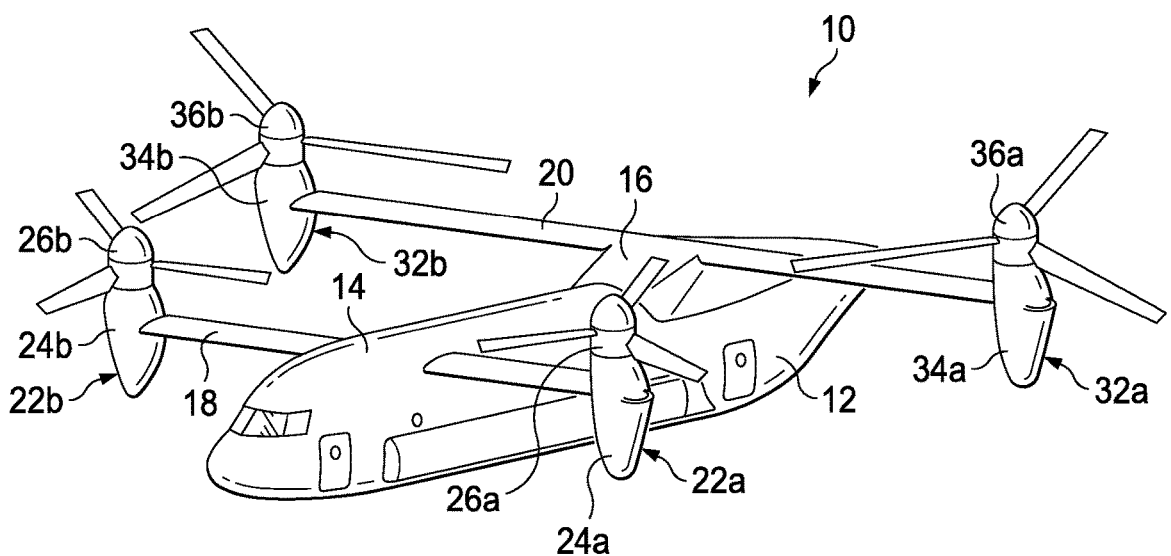
Figure 1D:
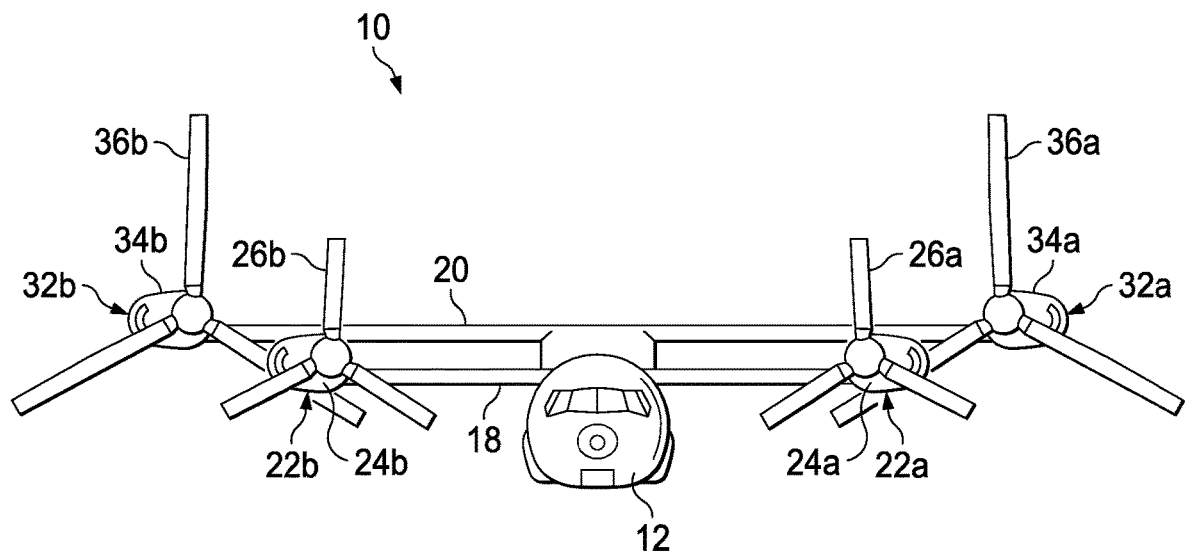
Figure 1C:
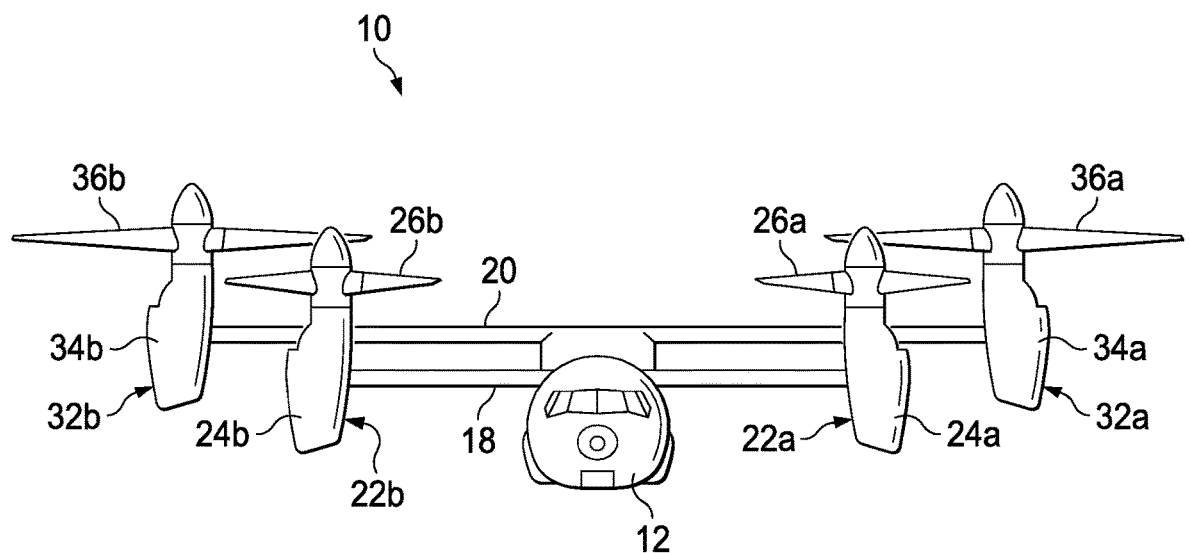
Figure 1F:
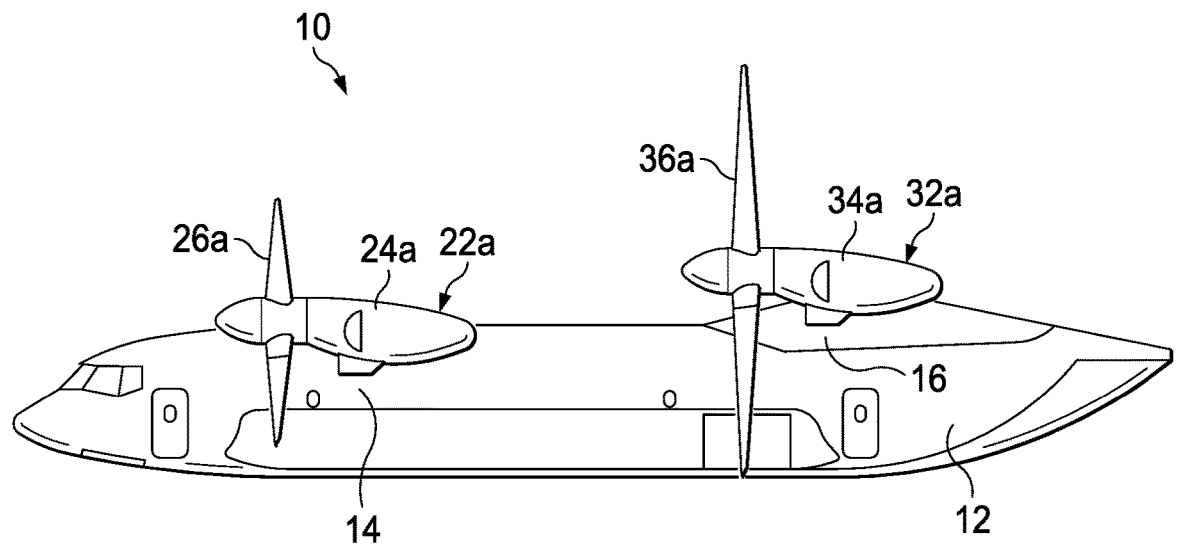
Figure 1E:
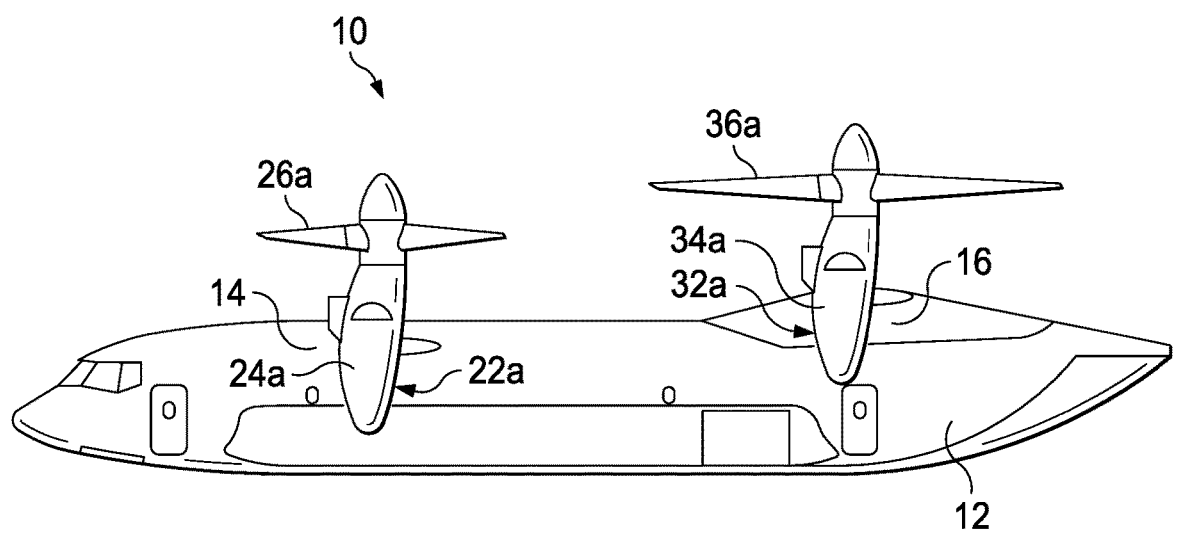
Figure 1H:
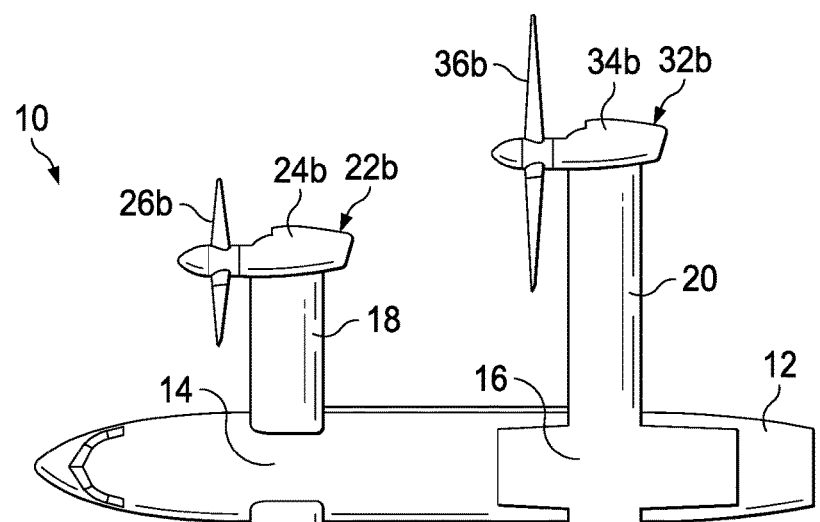
Figure 1G:
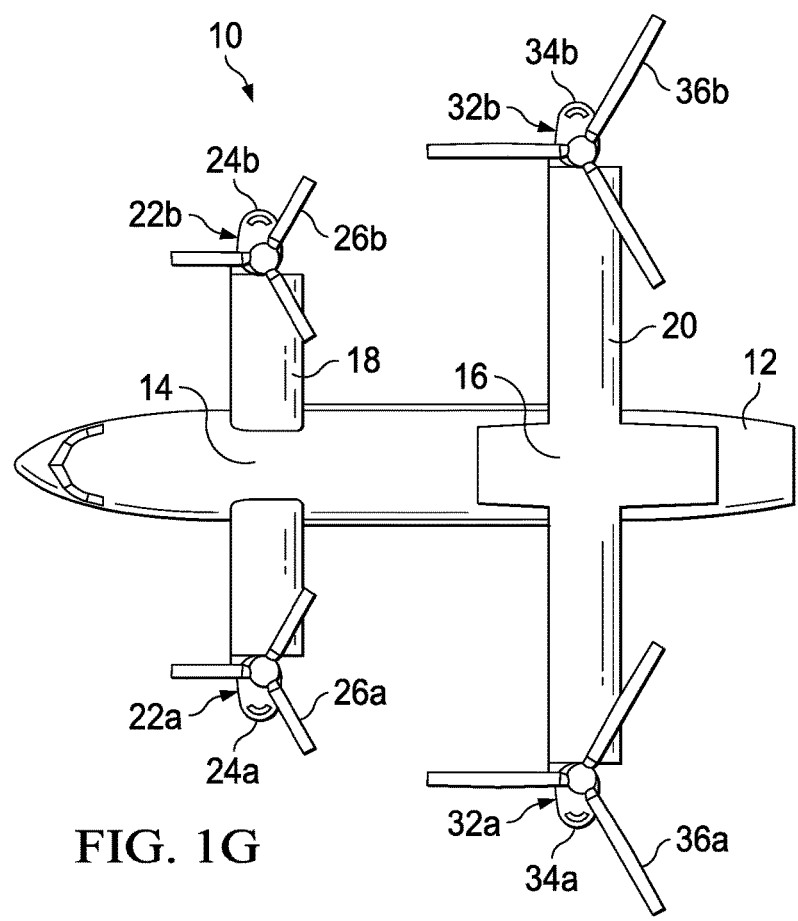

Referring to FIGS. 1A-1H in the drawings, various views of a quad tiltrotor aircraft 10 having higher disk-loading forward rotors and lower disk-loading aft rotors are depicted. In the illustrated embodiment, aircraft 10 has a longitudinally extending fuselage 12 that includes a forward station 14 and an aft station 16. Aircraft 10 includes a forward wing 18 that extends laterally from both sides of forward station 14 of fuselage 12. Aircraft 10 also includes an aft wing 20 that extends laterally from both sides of aft station 16 of fuselage 12. Each of wings 18, 20 has an airfoil cross-section that generates lift responsive to the forward airspeed of aircraft 10. Wings 18, 20 may include flaperons or other aerodynamic surfaces for controlling, for example, pitch and roll in the forward flight mode of aircraft 10. Wings 18, 20 are preferably formed from high strength and lightweight materials such as metals, polymers, fiberglass, carbon and combinations thereof. In the illustrated embodiment, the span of aft wing 20 is greater than the span of forward wing 18, as best seen in FIGS. 1G-1H. Also, in the illustrated embodiment, the elevation of aft wing 20 is greater than the elevation of forward wing 18 when aircraft 10 is in level flight, as best seen in FIGS. 1C-1D. In other embodiments, wings 18, 20 could have other configurations including having the same span and/or being at the same elevation. Together, fuselage 12 and wings 18, 20 as well as various frames, supports, longerons, stringers, bulkheads, spars, ribs, skins and the like may be considered to be the airframe of aircraft 10.

Coupled to outboard ends of forward wing 18 are forward propulsion assemblies 22a, 22b. Forward propulsion assembly 22a includes a forward nacelle 24a and a forward rotor 26a. Forward nacelle 24a preferably houses an engine and drive system that provides torque and rotational energy to rotate forward rotor 26a. Forward nacelle 24a is reversibly tiltable relative to forward wing 18 between a vertical lift orientation wherein forward rotor 26a rotates in a generally horizontal plane, as best seen in FIGS. 1A, 1C, 1E, 1G, and a forward thrust orientation wherein forward rotor 26a rotates in a generally vertical plane, as best seen in FIGS. 1B, 1D, 1F, 1H. Similarly, forward propulsion assembly 22b includes a forward nacelle 24b and a forward rotor 26b. Forward nacelle 24b preferably houses an engine and drive system that provides torque and rotational energy to rotate forward rotor 26b. Forward nacelle 24b is reversibly tiltable relative to forward wing 18 between a vertical lift orientation wherein forward rotor 26b rotates in a generally horizontal plane, as best seen in FIGS. 1A, 1C, 1E, 1G, and a forward thrust orientation wherein forward rotor 26b rotates in a generally vertical plane, as best seen in FIGS. 1B, 1D, 1F, 1H.

Coupled to outboard ends of aft wing 20 are aft propulsion assemblies 32a, 32b. Aft propulsion assembly 32a includes an aft nacelle 34a and an aft rotor 36a. Aft nacelle 34a preferably houses an engine and drive system that provides torque and rotational energy to rotate aft rotor 36a. Aft nacelle 34a is reversibly tiltable relative to aft wing 20 between a vertical lift orientation wherein aft rotor 36a rotates in a generally horizontal plane, as best seen in FIGS. 1A, 1C, 1E, 1G, and a forward thrust orientation wherein aft rotor 36a rotates in a generally vertical plane, as best seen in FIGS. 1B, 1D, 1F, 1H. Likewise, aft propulsion assembly 32b includes an aft nacelle 34b and an aft rotor 36b. Aft nacelle 34b preferably houses an engine and drive system that provides torque and rotational energy to rotate aft rotor 36b. Aft nacelle 34b is reversibly tiltable relative to aft wing 20 between a vertical lift orientation wherein aft rotor 36b rotates in a generally horizontal plane, as best seen in FIGS. 1A, 1C, 1E, 1G, and a forward thrust orientation wherein aft rotor 36b rotates in a generally vertical plane, as best seen in FIGS. 1B, 1D, 1F, 1H.

As best seen in FIG. 1D, forward rotors 26a, 26b are not inline with or are staggered relative to aft rotors 36a, 36b. In this configuration, the exhaust and/or propwash generated by forward rotors 26a, 26b has minimal impact on aft rotors 36a, 36b. In the illustrated embodiment, forward rotors 26a, 26b and aft rotors 36a, 36b each include three rotor blades. It should be understood by those having ordinary skill in the art, however, that forward rotors 26a, 26b and/or aft rotors 36a, 36b could alternatively have a different number of rotor blades, either less than or greater than three. In addition, it should be understood that the position of propulsion assemblies 22a, 22b, 32a, 32b, the angular velocity or revolutions per minute (RPM) of forward rotors 26a, 26b and aft rotors 36a, 36b, the pitch of the rotor blades and the like may be controlled by the pilot of aircraft 10 and/or a flight control system to selectively control the direction, thrust and lift of aircraft 10 during flight. Further, it should be understood by those having ordinary skill in the art that propulsion assemblies 22a, 22b, 32a, 32b could alternatively have fixed nacelles each housing an engine and a fixed portion of the drive system with a pylon assembly that is rotatable relative to the fixed nacelle and the wing to transition forward rotors 26a, 26b and aft rotors 36a, 36b between the vertical lift and forward thrust orientations.

In the illustrated embodiment, forward rotors 26a, 26b are higher disk-loading rotors and aft rotors 36a, 36b are lower disk-loading rotors. This unique configuration provides both high lift efficiency in the vertical takeoff and landing flight mode of aircraft 10 and high thrust efficiency in the forward flight mode of aircraft 10. Preferably, forward rotors 26a, 26b are optimized for forward thrust while aft rotors 36a, 36b are optimized for vertical lift. In such implementations, forward rotors 26a, 26b may exhibit the characteristics of conventional turboprop rotors and aft rotors 36a, 36b may exhibit the characteristics of conventional helicopter rotors. For example, forward rotors 26a, 26b may be rigid rotors having collective pitch control. Aft rotors 36a, 36b may have collective pitch control and cyclic pitch control provided, for example, by a rise and fall swash plate. In addition, aft rotors 36a, 36b may be capable of flapping provided, for example, by a gimbaled rotor system. In other implementations, forward rotors 26a, 26b may be gimbaled rotors, forward rotors 26a, 26b may have cyclic pitch control and/or aft rotors 36a, 36b may have only collective pitch control.

In the illustrated embodiment, the ratio of the diameters of forward rotors 26a, 26b to aft rotors 36a, 36b may be between about 1 to 3 and about 2 to 3. The ratio of the rotor speeds of forward rotors 26a, 26b to aft rotors 36a, 36b may be between about 2 to 1 and about 3 to 1. In the vertical takeoff and landing flight mode of aircraft 10, aft rotors 36a, 36b may generate between about 60 percent and 80 percent of the vertical lift. Once aircraft 10 has transitioned to forward flight mode, the rotor blades of aft rotors 36a, 36b are preferably folded to reduce drag in which case forward rotor 26a, 26b generate 100 percent of the forward thrust.

Each propulsion assembly 22a, 22b, 32a, 32b is independently controllable such that operational changes of certain propulsion assemblies enable pitch, roll and yaw control of aircraft 10 during VTOL operations. For example, by changing the thrust output of forward propulsion assemblies 22a, 22b relative to aft propulsion assemblies 32a, 32b, pitch control is achieved. As another example, by changing the thrust output of aft propulsion assembly 32a relative to aft propulsion assembly 32b, roll control is achieved. Changing the relative thrust outputs of the various propulsion assembly 22a, 22b, 32a, 32b may be accomplished using, for example, differential collective control. Yaw control or torque balance of aircraft 10 during VTOL operations may be achieved in a variety of ways. In the illustrated embodiment, forward propulsion assemblies 22a, 22b may co-rotate with aft propulsion assemblies 32a, 32b counter-rotating. One way to counteract the torque imbalance is to utilize differential longitudinal thrust vectoring of aft propulsion assemblies 32a, 32b. For example, aft propulsion assembly 32a may be tilted forward while aft propulsion assembly 32b may be tilted aftward to generate thrust vectors that counteract the torque imbalance. Another way to counteract the torque imbalance is to utilize torque offset of aft propulsion assemblies 32a, 32b. For example, aft propulsion assemblies 32a, 32b may be tilted starboard to generate a thrust vector that counteracts the torque imbalance. As another alternative, differential collective control of the various propulsion assembly 22a, 22b, 32a, 32b may be used to balance torque. In other embodiments, forward propulsion assemblies 22a, 22b may counter-rotate with aft propulsion assemblies 32a, 32b also counter-rotating. In this implementation, yaw control may be achieved, using differential longitudinal thrust vectoring and/or differential collective control of the various propulsion assembly 22a, 22b, 32a, 32b.

Figure 2A:
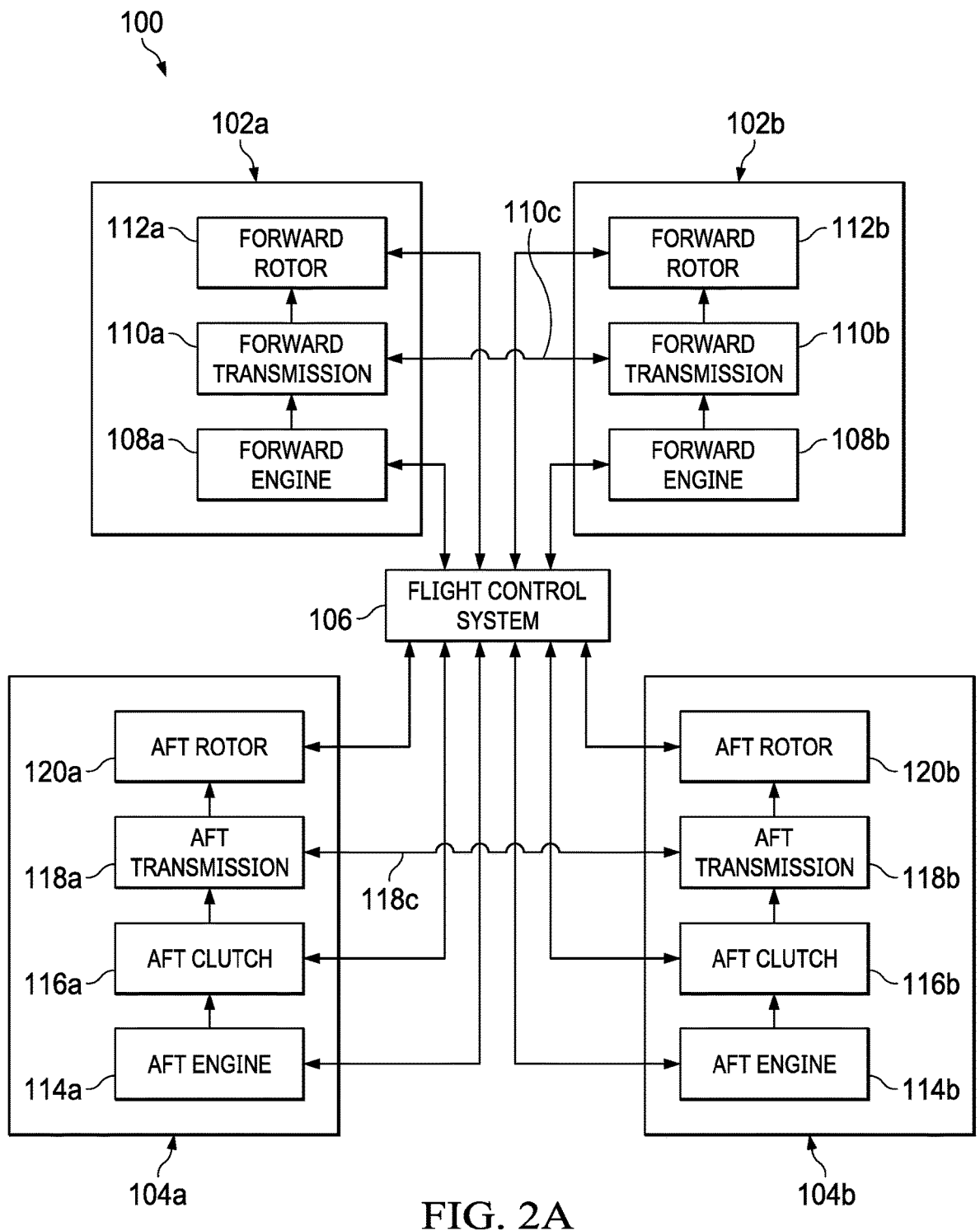
FIGS. 2A-2B are block diagrams of propulsion and control systems for a quad tiltrotor aircraft having higher disk-loading forward rotors and lower disk-loading aft rotors in accordance with embodiments of the present disclosure.

Referring additionally to FIG. 2A, a block diagram depicts a propulsion and control systems for a quad tiltrotor aircraft 100 having higher disk-loading forward rotors and lower disk-loading aft rotors. Aircraft 100 includes forward propulsion assemblies 102a, 102b, aft propulsion assemblies 104a, 104b and a flight control system 106. Forward propulsion assembly 102a includes forward engine 108a, forward transmission 110a and forward rotor 112a. Forward propulsion assembly 102b includes forward engine 108b, forward transmission 110b and forward rotor 112b. Aft propulsion assembly 104a includes aft engine 114a, aft clutch 116a, aft transmission 118a and aft rotor 120a. Aft propulsion assembly 104b includes aft engine 114b, aft clutch 116b, aft transmission 118b and aft rotor 120b.

In the illustrated embodiment, engines 108a, 108b, 114a, 114b are internal combustion engines operable to burn a liquid fluid. Alternatively, engines 108a, 108b, 114a, 114b could be one or more electric or hydraulic motors. In the illustrated embodiment, transmissions 110a, 110b, 118a, 118b are gear reducing transmissions designed to enable optimum engine speed and optimal rotor speed during flight operations. In the illustrated embodiment, a cross shaft 110c couples forward transmissions 110a, 110b together such that either forward engine 108a, forward engine 108b or both can drive each of forward rotors 112a, 112b. In other embodiments, forward transmissions 110a, 110b are not coupled together with a cross shaft. In the illustrated embodiment, a cross shaft 118c couples aft transmissions 118a, 118b together such that either aft engine 114a, aft engine 114b or both can drive each of aft rotors 120a, 120b. As discussed herein, forward rotors 112a, 112b are higher disk-loading rotors and aft rotors 120a, 120b are lower disk-loading rotors, which provide both high lift efficiency in the vertical takeoff and landing flight mode of aircraft 100 and high thrust efficiency in the forward flight mode of aircraft 100.

Aft clutches 116a, 116b enable selective engagement and disengagement of aft engines 114a, 114b from aft transmissions 118a, 118b, respectively. Aft clutches 116a, 116b may be sprag clutches, friction clutches or other suitable clutching mechanisms. Aft clutches 116a, 116b enable two distinct features of the present embodiments. First, a preferred method of stopping and starting the rotation of aft rotors 120a, 120b during the forward flight mode of aircraft 100 is to operate aft clutches 116a, 116b to disengage and engage aft engines 114a, 114b from aft transmissions 118a, 118b. In the disengaged configuration, aft rotors 120a, 120b may aerodynamically controlled to rotate at a desired speed, including stopping aft rotors 120a, 120b by feathering the rotor blades. In the stopped configuration of aft rotors 120a, 120b, the rotor blades of aft rotors 120a, 120b may be folded to reduce drag, thereby extending the range for aircraft 100 with forward rotors 112a, 112b providing the required forward thrust. Second, aft clutches 116a, 116b enable disengagement of aft engines 114a, 114b from aft transmissions 118a, 118b in VTOL operations during an emergency landing requiring autorotation of aft rotors 120a, 120b, for example, in the event of one or more engine failures. Providing an autorotation option for the pilot of aircraft 100 improves the overall safety of aircraft 100.

Flight control system 106, such as a digital flight control system, is preferably a redundant flight control system and more preferably a triply redundant flight control system including three independent flight control computers. Use of triply redundant flight control system 106 improves the overall safety and reliability of aircraft 100 in the event of a failure in flight control system 106. Flight control system 106 preferably includes non-transitory computer readable storage media including a set of computer instructions executable by one or more processors for controlling the operation of the distributed propulsion system. Flight control system 106 may be implemented on one or more general-purpose computers, special purpose computers or other machines with memory and processing capability. For example, flight control system 106 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 106 may be a microprocessor-based system operable to execute program code in the form of machine-executable instructions. In addition, flight control system 106 may be selectively connectable to other computer systems via a proprietary encrypted network, a public encrypted network, the Internet or other suitable communication network that may include both wired and wireless connections.

Flight control system 106 communicates via a wired and/or wireless communications network depicted as the communication arrows between flight control system 106 and the various components of each propulsion assembly 102a, 102b, 104a, 104b. Flight control system 106 receives sensor data from and sends flight command information to each propulsion assembly 102a, 102b, 104a, 104b to individually and independently control and operate each propulsion assembly 102a, 102b, 104a, 104b. Flight control system 106 may autonomously control some or all aspects of flight operation for aircraft 100. Flight control system 106 may also be operable to communicate with one or more remote systems, via a wireless communications protocol. The remote systems may be operable to receive flight data from and provide commands to flight control system 106 to enable remote flight control over some or all aspects of flight operation for aircraft 100. A pilot within aircraft 100 may receive flight data from and provide commands to flight control system 106 to enable onboard pilot control over some or all aspects of flight operation for aircraft 100.

As examples, flight control system 106 is operable to independently start, stop and control the operational speeds of engines 108a, 108b, 114a, 114b. Flight control system 106 is operable to independently or collectively operate propulsion assemblies 102a, 102b, 104a, 104b between the vertical lift and forward thrust orientations. Flight control system 106 is operable to independently or collectively operate aft clutches 116a, 116b between the engaged and disengaged positions. Flight control system 106 is operable to independently engage and disengage cross shafts 110c, 118c. Flight control system 106 is operable to independently or collectively change the pitch of the rotor blades of rotors 112a, 112b, 120a, 120b. Flight control system 106 is operable to independently or collectively fold the rotor blades of aft rotors 120a, 120b.

Figure 2B:
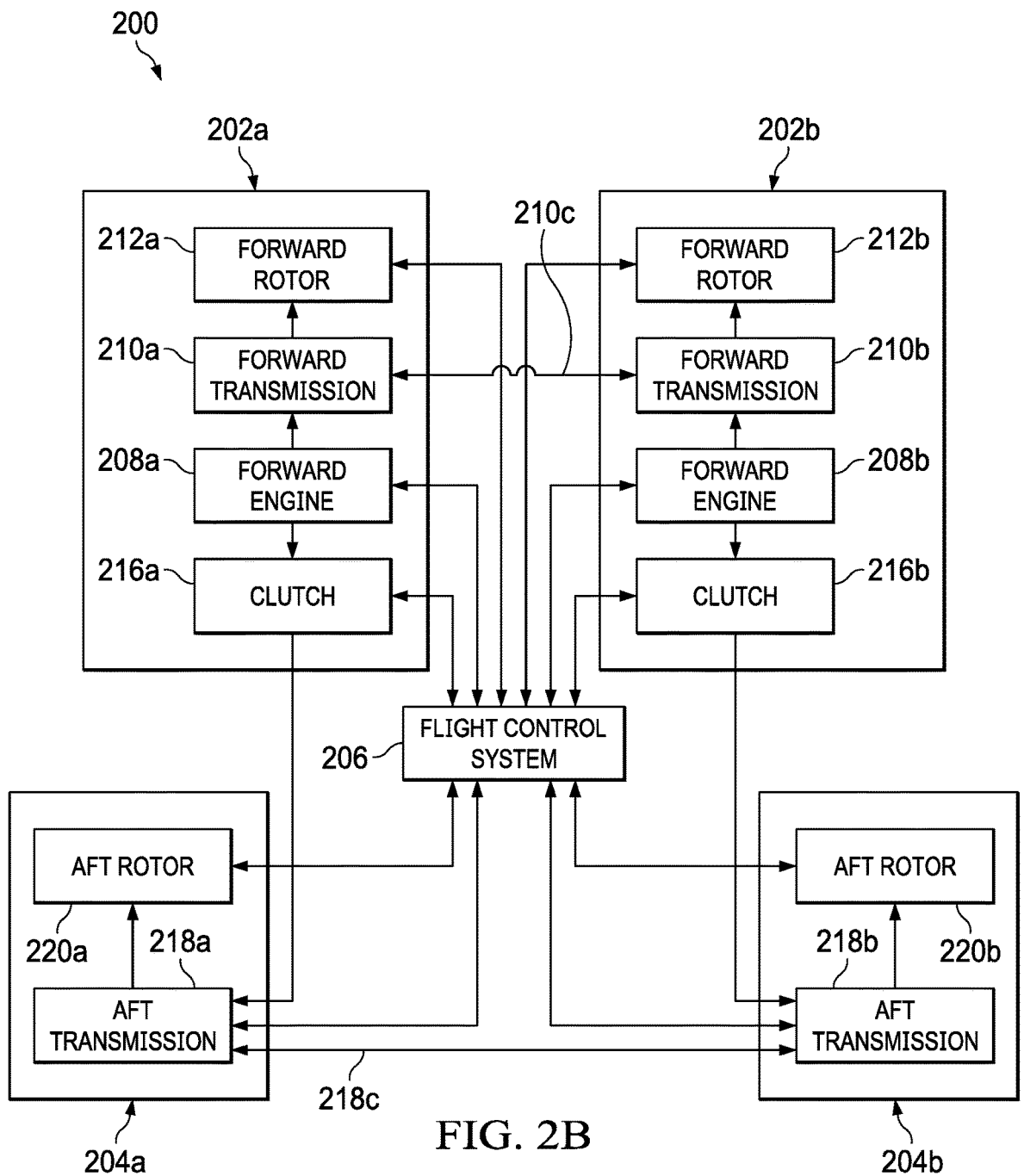

Referring now to FIG. 2B, a block diagram depicts a propulsion and control systems for a quad tiltrotor aircraft 200 having higher disk-loading forward rotors and lower disk-loading aft rotors. Aircraft 200 includes forward propulsion assemblies 202a, 202b, aft propulsion assemblies 204a, 204b and a flight control system 206. Forward propulsion assembly 202a includes forward engine 208a, forward transmission 210a, forward rotor 212a and a clutch 216a. Forward propulsion assembly 202b includes forward engine 208b, forward transmission 210b, forward rotor 212b and clutch 216b. Aft propulsion assembly 204a includes aft transmission 218a and aft rotor 220a. Aft propulsion assembly 204b includes aft transmission 218b and aft rotor 220b.

In the illustrated embodiment, forward engines 208a, 208b provide torque and rotational energy to both forward rotors 212a, 212b and aft rotors 220a, 220b. In the illustrated embodiment, forward transmissions 210a, 210b are gear reducing transmissions designed to enable optimum engine speed for forward engines 208a, 208b and optimal rotor speed for forward rotors 212a, 212b. Likewise, aft transmissions 218a, 218b are gear reducing transmissions designed to enable optimum engine speed for forward engines 208a, 208b and optimal rotor speed for aft rotors 220a, 220b. In the illustrated embodiment, a cross shaft 210c couples forward transmissions 210a, 210b together such that either forward engine 208a, forward engine 208b or both can drive each of forward rotors 212a, 212b. Likewise, a cross shaft 218c couples aft transmissions 218a, 218b together such that either forward engine 208a, forward engine 208b or both can drive each of aft rotors 220a, 220b. As discussed herein, forward rotors 212a, 212b are higher disk-loading rotors and aft rotors 220a, 220b are lower disk-loading rotors, which provide both high lift efficiency in the vertical takeoff and landing flight mode of aircraft 200 and high thrust efficiency in the forward flight mode of aircraft 200.

Clutches 216a, 216b enable selective engagement and disengagement of forward engines 208a, 208b from aft transmissions 218a, 218b, respectively. Clutches 216a, 216b enable stop and fold of the rotor blades of aft rotors 220a, 220b during forward flight of aircraft 200 to extend the range for aircraft 200 with forward rotors 212a, 212b providing the required forward thrust. Clutches 216a, 216b also enable autorotation of aft rotors 220a, 220b during VTOL operations in the event of an emergency landing due, for example, to mechanical failures.

Figure 3G:
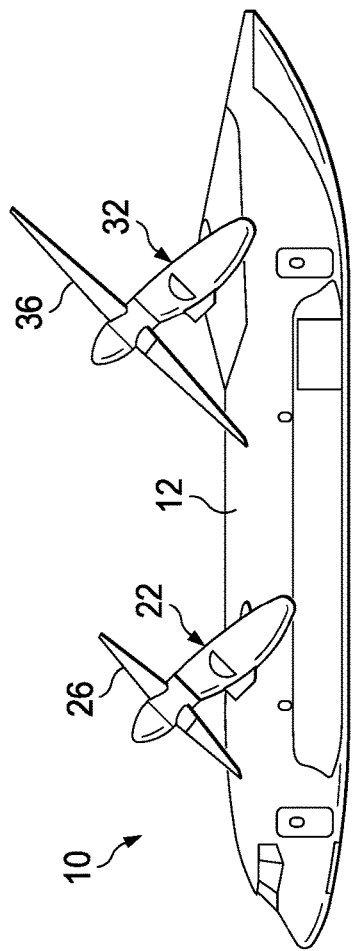

Referring next to FIGS. 3A-3I in the drawings, a sequential flight-operating scenario of aircraft 10 is depicted. As best seen in FIG. 3A, aircraft 10 is positioned on a launch surface at a current location. Aircraft 10 is in the vertical lift orientation of forward propulsion assemblies 22 and aft propulsion assemblies 32 with forward rotors 26 and aft rotors 36 operating. Aircraft 10 may be operating responsive to autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations.

Regardless of the chosen flight control mode, each of forward propulsion assemblies 22 and aft propulsion assemblies 32 may be independently controllable during flight operations. For example, as best seen in FIG. 3B, to aid in stabilization during VTOL operations including pitch, roll and yaw control during hover, it may be desirable to adjust the thrust output, torque output and/or thrust vector of one or more of forward propulsion assemblies 22 and aft propulsion assemblies 32 as discussed herein. After vertical assent to the desired elevation, aircraft 10 may begin the transition from vertical takeoff to forward flight. As best seen in FIGS. 3B-3D, as aircraft 10 transitions from vertical takeoff and landing flight mode to forward flight mode, forward propulsion assemblies 22 and aft propulsion assemblies 32 transition from the vertical lift orientation, as best seen in FIG. 3B, to the forward thrust orientation, as best seen in FIG. 3D, by tilting from an upwardly pointing orientation to a forward pointing orientation. It is noted that aircraft 10 remains in a generally horizontal attitude during this transition for the safety and comfort of passengers, crew and/or cargo carried in aircraft 10.

Once aircraft 10 has completed the transition to forward flight mode, certain of forward propulsion assemblies 22 and aft propulsion assemblies 32 may be operated at reduced speed or shut down as the thrust requirements in forward flight mode are reduced compared to the thrust requirements of vertical takeoff and landing flight mode. For example, as best seen in FIG. 3E, aft propulsion assemblies 32 have been shut down and the rotor blades of aft rotors 36 have folded to reduce drag. Alternatively, after aft propulsion assemblies 32 are shut down the rotor blades of aft rotors 36 may be feathered with the rotor hubs unlock allowing aft rotors 36 to windmill or aft rotors 36 may be locked from rotating without folding.

Figure 3H:
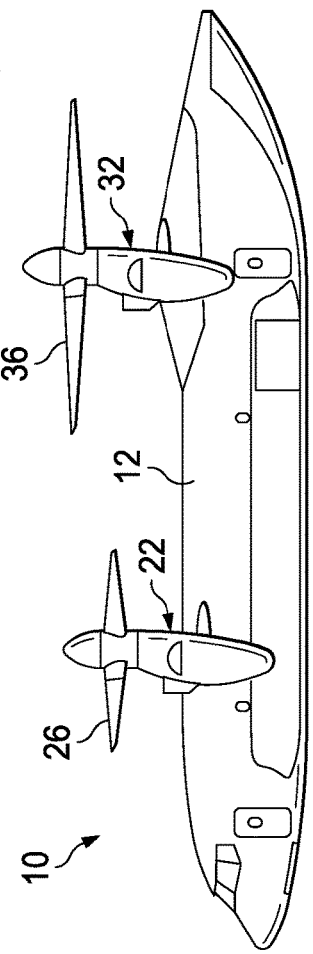
Figure 3I:
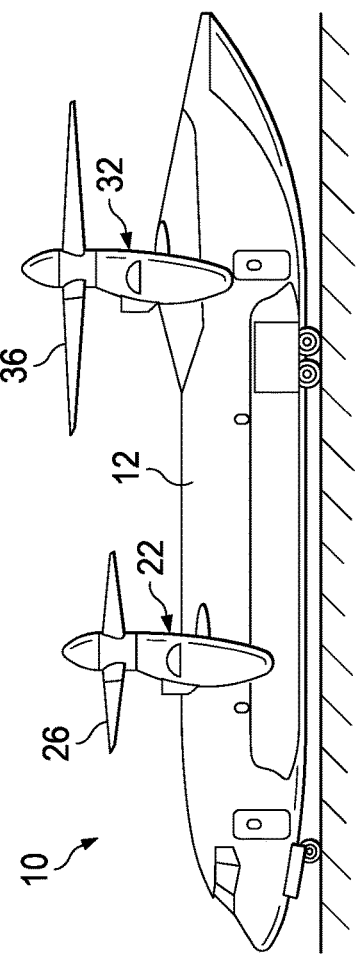

When aircraft 10 begins its approaches to the destination, any forward propulsion assemblies 22 or aft propulsion assemblies 32 that were shut down or operated at a reduced speed are reengaged to provide full propulsion capabilities, as best seen in 3F. Aircraft 10 may now begin its transition from forward flight mode to vertical takeoff and landing flight mode. As best seen in FIGS. 3F-3H, as aircraft 10 transitions from forward flight mode to vertical takeoff and landing flight mode, forward propulsion assemblies 22 and aft propulsion assemblies 32 transition from the forward thrust orientation, as best seen in FIG. 3F, to the vertical lift orientation, as best seen in FIG. 3H, by tilting from the forward pointing orientation to the upward pointing orientation. It is noted that aircraft 10 remains in a generally horizontal attitude during this transition for the safety and comfort of passengers, crew and/or cargo carried in aircraft 10. Once aircraft 10 has completed the transition to vertical takeoff and landing flight mode, as best seen in FIG. 3H, aircraft 10 may commence its vertical descent to a landing surface at the destination location. As best seen in FIG. 3I, aircraft 10 has landed and is resting on the surface. Aircraft 10 may now engage in ground maneuvers, if desired.

Figure 4:
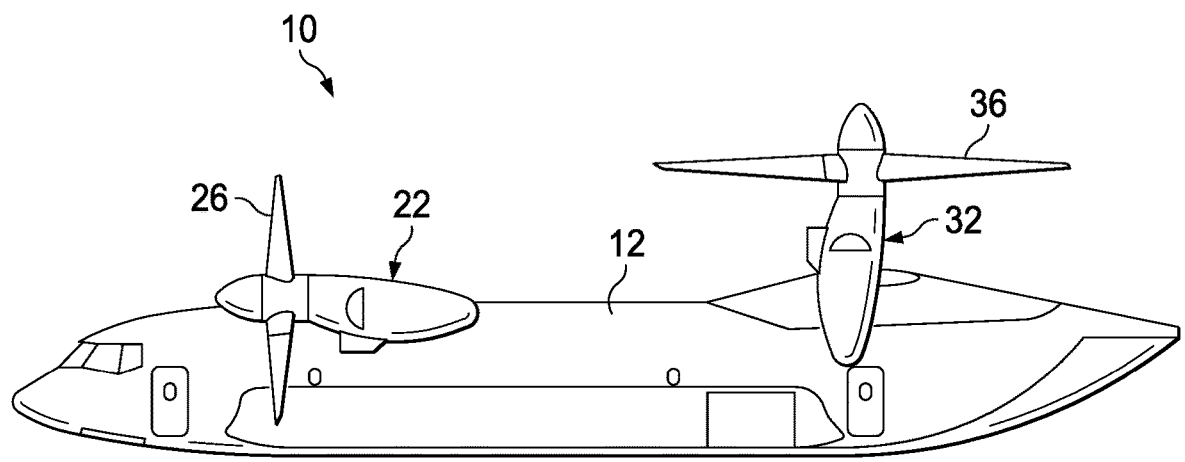
FIG. 4 is a side view of a quad tiltrotor aircraft having higher disk-loading forward rotors and lower disk-loading aft rotors in a STOL configuration in accordance with embodiments of the present disclosure.

Referring next to FIG. 4 in the drawings, quad tiltrotor aircraft 10 is depicted in a short takeoff and landing (STOL) configuration. In general, a STOL aircraft is an aircraft capable of taking off and landing with short runway requirements. One way to reduce the length of a required runway during landing is to have a low minimum flying speed. As aircraft 10 is capable of hover, achieving a low minimum flight speed is well within its flight envelope. Reducing the length of a required runway for takeoffs typically requires increasing the power/weight ratio and/or lowering the drag of an aircraft. As aircraft 10 is capable of VTOL takeoffs, there is considerable spare power available for STOL takeoffs as the wings provide lift response to the forward airspeed during STOL takeoffs. As illustrated, aircraft 10 can be configured with forward propulsion assemblies 22 in the forward thrust orientation having forward rotors 26 rotating in a generally vertical plane and with aft propulsion assemblies 32 in the vertical lift orientation having aft rotors 36 rotating in a generally horizontal plane. In this configuration, aircraft 10 can operate as a STOL aircraft with reduced power requirements for takeoff and landing compared to VTOL operations. Alternatively, quad tiltrotor aircraft 10 may operate as a STOL aircraft by configuring forward propulsion assemblies 22 in an intermediate position between the vertical lift and forward thrust orientations and by configuring aft propulsion assemblies 32 in an intermediate position between the vertical lift and forward thrust orientations, as best seen in FIGS. 3C, 3G. In this configuration, the thrust vector of each propulsion assembly 22, 32 contributes to both vertical lift and forward thrust, thereby enabling STOL operations.

Figure 5:
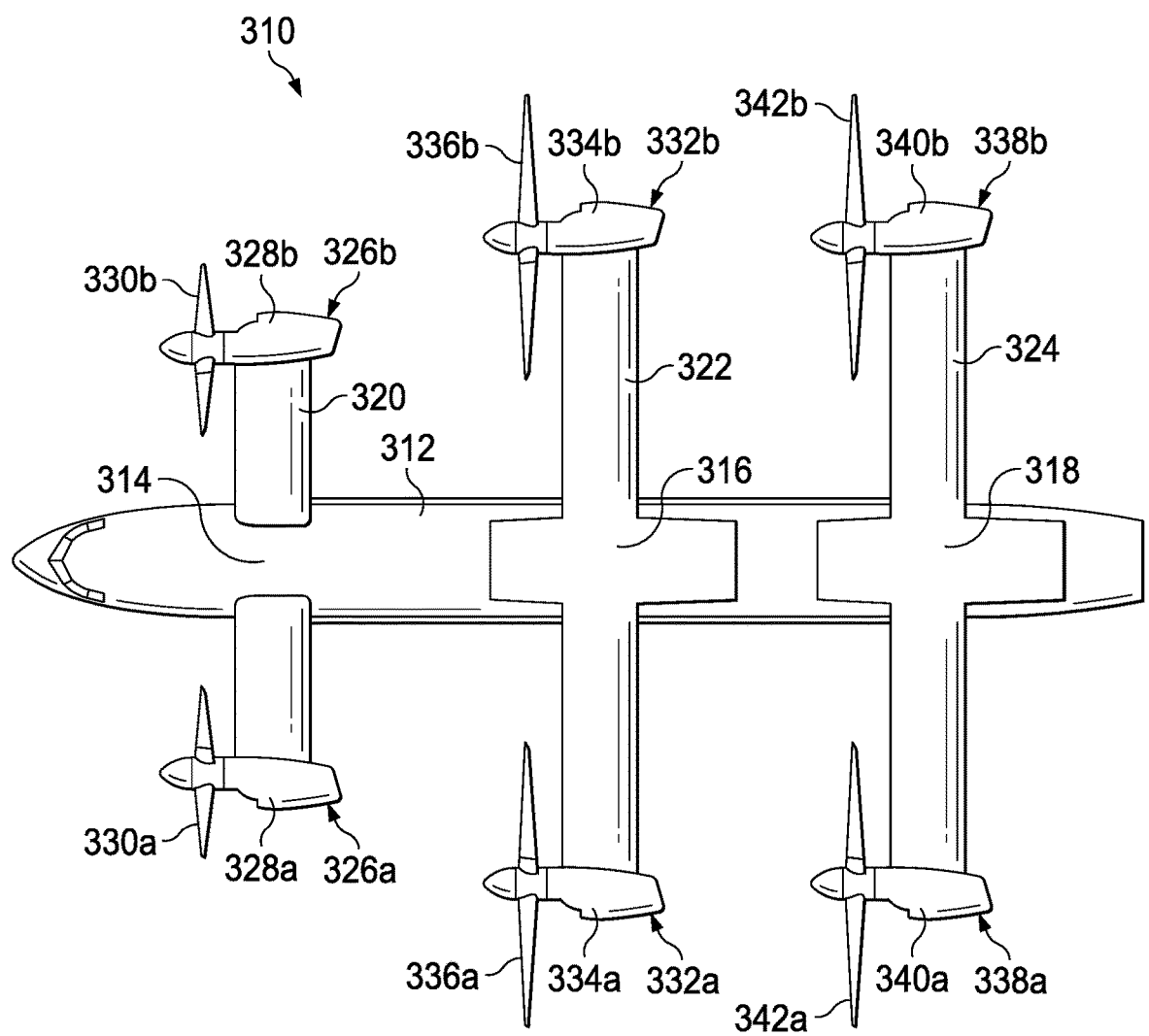
FIG. 5 is a top view of a tiltrotor aircraft having higher disk-loading forward rotors and lower disk-loading mid and aft rotors in accordance with embodiments of the present disclosure.

Referring next to FIG. 5 in the drawings, a tiltrotor aircraft 310 having higher disk-loading forward rotors and lower disk-loading mid and aft rotors is depicted. In the illustrated embodiment, aircraft 310 has a longitudinally extending fuselage 312 that includes a forward station 314, a mid station 316 and an aft station 318. Aircraft 310 includes a forward wing 320 that extends laterally from both sides of forward station 314 of fuselage 312, a mid wing 322 that extends laterally from both sides of mid station 316 of fuselage 312 and an aft wing 224 that extends laterally from both sides of aft station 318 of fuselage 312. Each of wings 320, 322, 324 has an airfoil cross-section that generates lift responsive to the forward airspeed of aircraft 310. Wings 320, 322, 324 may include flaperons or other aerodynamic surfaces for controlling, for example, pitch and roll in the forward flight mode of aircraft 310. Wings 320, 322, 324 are preferably formed from high strength and lightweight materials such as metals, polymers, fiberglass, carbon and combinations thereof. In the illustrated embodiment, the span of mid wing 322 and aft wing 324 is greater than the span of forward wing 320. Also, in the illustrated embodiment, the elevation of mid wing 322 and aft wing 324 is greater than the elevation of forward wing 320 when aircraft 310 is in level flight. Together, fuselage 312 and wings 320, 322, 324 as well as various frames, supports, longerons, stringers, bulkheads, spars, ribs, skins and the like may be considered to be the airframe of aircraft 310.

Coupled to outboard ends of forward wing 320 are forward propulsion assemblies 326a, 326b. Forward propulsion assembly 326a includes a forward nacelle 328a and a forward rotor 330a. Forward nacelle 328a preferably houses an engine and drive system that provides torque and rotational energy to rotate forward rotor 330a. Forward nacelle 328a is reversibly tiltable relative to forward wing 320 between a vertical lift orientation wherein forward rotor 330a rotates in a generally horizontal plane and a forward thrust orientation wherein forward rotor 330a rotates in a generally vertical plane. Similarly, forward propulsion assembly 326b includes a forward nacelle 328b and a forward rotor 330b. Forward nacelle 328b preferably houses an engine and drive system that provides torque and rotational energy to rotate forward rotor 330b. Forward nacelle 328b is reversibly tiltable relative to forward wing 320 between a vertical lift orientation wherein forward rotor 330b rotates in a generally horizontal plane and a forward thrust orientation wherein forward rotor 330b rotates in a generally vertical plane.

Coupled to outboard ends of mid wing 322 are mid propulsion assemblies 332a, 332b. Mid propulsion assembly 332a includes a mid nacelle 334a and a mid rotor 336a. Mid nacelle 334a preferably houses an engine and drive system that provides torque and rotational energy to rotate mid rotor 336a. Mid nacelle 334a is reversibly tiltable relative to mid wing 322 between a vertical lift orientation wherein mid rotor 336a rotates in a generally horizontal plane and a forward thrust orientation wherein mid rotor 336a rotates in a generally vertical plane. Similarly, mid propulsion assembly 332b includes a mid nacelle 334b and a mid rotor 336b. Mid nacelle 334b preferably houses an engine and drive system that provides torque and rotational energy to rotate mid rotor 336b. Mid nacelle 334b is reversibly tiltable relative to mid wing 322 between a vertical lift orientation wherein mid rotor 336b rotates in a generally horizontal plane and a forward thrust orientation wherein mid rotor 336b rotates in a generally vertical plane.

Coupled to outboard ends of aft wing 324 are aft propulsion assemblies 338a, 338b. Aft propulsion assembly 338a includes an aft nacelle 340a and an aft rotor 342a. Aft nacelle 340a preferably houses an engine and drive system that provides torque and rotational energy to rotate aft rotor 342a. Aft nacelle 340a is reversibly tiltable relative to aft wing 324 between a vertical lift orientation wherein aft rotor 342a rotates in a generally horizontal plane and a forward thrust orientation wherein aft rotor 342a rotates in a generally vertical plane. Likewise, aft propulsion assembly 338b includes an aft nacelle 340b and an aft rotor 342b. Aft nacelle 340b preferably houses an engine and drive system that provides torque and rotational energy to rotate aft rotor 342b. Aft nacelle 340b is reversibly tiltable relative to aft wing 324 between a vertical lift orientation wherein aft rotor 342b rotates in a generally horizontal plane and a forward thrust orientation wherein aft rotor 342b rotates in a generally vertical plane.

Forward rotors 330a, 330b are not inline with or are staggered relative to mid rotors 336a, 336b and aft rotors 342a, 342b. In this configuration, the exhaust and/or propwash generated by forward rotors 330a, 330b has minimal impact on mid rotors 336a, 336b and aft rotors 342a, 342b. In the illustrated embodiment, mid rotors 336a, 336b are inline with aft rotors 342a, 342b. In other embodiments, mid rotors 336a, 336b may be staggered relative aft rotors 342a, 342b. In the illustrated embodiment, forward rotors 330a, 330b are higher disk-loading rotors and mid rotors 336a, 336b and aft rotors 342a, 342b are lower disk-loading rotors. This unique configuration provides both high lift efficiency in the vertical takeoff and landing flight mode of aircraft 310 and high thrust efficiency in the forward flight mode of aircraft 310. Preferably, forward rotors 330a, 330b are optimized for forward thrust while mid rotors 336a, 336b and aft rotors 342a, 342b are optimized for vertical lift. In such implementations, forward rotors 330a, 330b may exhibit the characteristics of conventional turboprop rotors while mid rotors 336a, 336b and aft rotors 342a, 342b may exhibit the characteristics of conventional helicopter rotors. For example, forward rotors 330a, 330b may be rigid rotors having collective pitch control. Mid rotors 336a, 336b and aft rotors 342a, 342b may have collective pitch control and cyclic pitch control provided, for example, by a rise and fall swash plate. In addition, mid rotors 336a, 336b and aft rotors 342a, 342b may be capable of flapping provided, for example, by a gimbaled rotor system.

In the vertical takeoff and landing flight mode of aircraft 310, mid rotors 336a, 336b and aft rotors 342a, 342b may generate between about 80 percent and 100 percent of the vertical lift. Once aircraft 310 has transitioned to forward flight mode, the rotor blades of mid rotors 336a, 336b and aft rotors 342a, 342b are preferably folded to reduce drag in which case forward rotor 330a, 330b generate 100 percent of the forward thrust. Each propulsion assembly 326a, 326b, 332a, 332b, 338a, 338b is independently controllable such that operational changes of certain propulsion assemblies enable pitch, roll and yaw control of aircraft 310 during VTOL operations using, for example, differential longitudinal thrust vectoring and/or differential collective control.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A quad tiltrotor aircraft having a vertical takeoff and landing flight mode and a forward flight mode, the aircraft comprising:
   a longitudinally extending fuselage having forward and aft stations;
   a forward wing extending laterally from the forward station having first and second outboard ends;
   an aft wing extending laterally from the aft station having first and second outboard ends;
   first and second forward rotors respectively coupled proximate the first and second outboard ends of the forward wing, the first and second forward rotors reversibly tiltable relative to the forward wing between a vertical lift orientation and a forward thrust orientation; and
   first and second aft rotors respectively coupled proximate the first and second outboard ends of the aft wing, the first and second aft rotors reversibly tiltable relative to the aft wing between a vertical lift orientation and a forward thrust orientation;
   wherein, the forward rotors are rigid rotors having collective pitch control;
   wherein, the aft rotors are gimbaled rotors having collective pitch control and cyclic pitch control;
   wherein, the forward rotors are higher disk-loading rotors than the aft rotors;

wherein, a rotor speed of the forward rotors is greater than a rotor speed of the aft rotors in the vertical takeoff and landing flight mode; and wherein, the aft rotors are foldable in the forward flight mode.

2. The quad tiltrotor aircraft as recited in claim 1 wherein the aft wing has a greater span than the forward wing.

3. The quad tiltrotor aircraft as recited in claim 1 wherein the aft wing has a higher elevation than the forward wing in level flight.

4. The quad tiltrotor aircraft as recited in claim 1 wherein the aft rotors have a larger diameter than the forward rotors.

5. The quad tiltrotor aircraft as recited in claim 1 wherein the forward rotors co-rotate.

6. The quad tiltrotor aircraft as recited in claim 1 wherein the forward rotors counter rotate.

7. The quad tiltrotor aircraft as recited in claim 1 wherein the aft rotors counter rotate.

8. The quad tiltrotor aircraft as recited in claim 1 wherein the aft rotors have a larger diameter than the forward rotors and wherein a ratio of the diameters of the forward rotors to the aft rotors is between 1 to 3 and 2 to 3.

9. The quad tiltrotor aircraft as recited in claim 1 wherein, in the vertical takeoff and landing flight mode, a ratio of rotor speeds of the forward rotors to the aft rotors is between 2 to 1 and 3 to 1.

10. The quad tiltrotor aircraft as recited in claim 1 further comprising at least one engine operable to drive the forward and aft rotors.

11. The quad tiltrotor aircraft as recited in claim 10 wherein the at least one engine further comprises first and second forward engines operable to respectively drive the first and second forward rotors and first and second aft engines operable to respectively drive the first and second aft rotors.

12. The quad tiltrotor aircraft as recited in claim 10 wherein the aft rotors are operable to disengage from the at least one engine during forward flight mode.

13. The quad tiltrotor aircraft as recited in claim 10 wherein the aft rotors are coupled together with a cross shaft such that either of the aft engines is operable to drive the first and second aft rotors.

14. The quad tiltrotor aircraft as recited in claim 10 wherein the forward rotors are not coupled together.

15. The quad tiltrotor aircraft as recited in claim 1 wherein the aft rotors are operable to autorotate.

16. The quad tiltrotor aircraft as recited in claim 1 wherein the forward and aft rotors further comprise differential collective control.

17. The quad tiltrotor aircraft as recited in claim 1 further comprising a first short takeoff and landing mode wherein the forward rotors are in the forward thrust orientation and the aft rotors are in the vertical lift orientation and a second short takeoff and landing mode wherein the forward rotors are between the vertical lift and forward thrust orientations and the aft rotors are between the vertical lift and forward thrust orientations.

18. A tiltrotor aircraft having a vertical takeoff and landing flight mode and a forward flight mode, the aircraft comprising:
    a longitudinally extending fuselage having forward, mid and aft stations;
    a forward wing extending laterally from the forward station having first and second outboard ends;
    a mid wing extending laterally from the mid station having first and second outboard ends;
    an aft wing extending laterally from the aft station having first and second outboard ends;
    first and second forward rotors respectively coupled proximate the first and second outboard ends of the forward wing, the first and second forward rotors reversibly tiltable relative to the forward wing between a vertical lift orientation and a forward thrust orientation;
    first and second mid rotors respectively coupled proximate the first and second outboard ends of the mid wing, the first and second mid rotors reversibly tiltable relative to the mid wing between a vertical lift orientation and a forward thrust orientation; and
    first and second aft rotors respectively coupled proximate the first and second outboard ends of the aft wing, the first and second aft rotors reversibly tiltable relative to the aft wing between a vertical lift orientation and a forward thrust orientation;
    wherein, the forward rotors are rigid rotors having collective pitch control;
    wherein, the mid and aft rotors are gimbaled rotors having collective pitch control and cyclic pitch control;
    wherein, the forward rotors are higher disk-loading rotors than the mid and aft rotors;
    wherein, a rotor speed of the forward rotors is greater than a rotor speed of the mid rotors and the aft rotors in the vertical takeoff and landing flight mode; and
    wherein, the mid and aft rotors are foldable in the forward flight mode.

19. The quad tiltrotor aircraft as recited in claim 18 wherein, in the vertical takeoff and landing flight mode, a ratio of rotor speeds of the forward rotors to the mid rotors and the aft rotors is between 2 to 1 and 3 to 1.

20. The quad tiltrotor aircraft as recited in claim 18 wherein each of the mid rotors and the aft rotors has a larger diameter than the forward rotors and wherein a ratio of the diameters of the forward rotors to the mid rotors and the aft rotors is between 1 to 3 and 2 to 3.

* * * * *